(12) United States Patent
Ishikawa

(10) Patent No.: US 11,480,787 B2
(45) Date of Patent: Oct. 25, 2022

(54) INFORMATION PROCESSING APPARATUS AND INFORMATION PROCESSING METHOD

(71) Applicant: SONY CORPORATION, Tokyo (JP)

(72) Inventor: Tsuyoshi Ishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 19 days.

(21) Appl. No.: 16/981,764

(22) PCT Filed: Mar. 12, 2019

(86) PCT No.: PCT/JP2019/009855
§ 371 (c)(1),
(2) Date: Sep. 17, 2020

(87) PCT Pub. No.: WO2019/188229
PCT Pub. Date: Oct. 3, 2019

(65) Prior Publication Data
US 2021/0096361 A1   Apr. 1, 2021

(30) Foreign Application Priority Data

Mar. 26, 2018   (JP) .............................. JP2018-057580

(51) Int. Cl.
*G02B 27/00* (2006.01)
*G06F 3/01* (2006.01)
(Continued)

(52) U.S. Cl.
CPC ......... *G02B 27/0093* (2013.01); *G06F 3/012* (2013.01); *H04N 5/2224* (2013.01);
(Continued)

(58) Field of Classification Search
CPC ...... A63F 13/212; A63F 13/428; A63F 13/25; A63F 13/211; A63F 13/5255;
(Continued)

(56) References Cited

U.S. PATENT DOCUMENTS 9,417,762 B2 * 8/2016 Frost ....................... G06F 3/011
9,865,089 B2 * 1/2018 Burns ................ G02B 27/0172
(Continued)

FOREIGN PATENT DOCUMENTS

CN    109478341 A    3/2019
JP    2017-027163 A   2/2017
(Continued)

OTHER PUBLICATIONS

Extended European Search Report of EP Application No. 19776170.3, dated Mar. 30, 2021, 10 pages.
(Continued)

*Primary Examiner* — Vinh T Lam
(74) *Attorney, Agent, or Firm* — Chip Law Group

(57) ABSTRACT

The present technology relates to an information processing apparatus, an information processing method, and a program that make it possible to eliminate or minimize VR sickness with an immersive feeling enhanced. On the basis of head posture of a user, a video generation section generates a video resulting from control of an angle of view of a virtual camera, the angle of view corresponding to a field of view of the user travelling in a virtual space. When the user is in an acceleration state in the virtual space, the video generation section changes the angle of view of the virtual camera from a first angle of view at the time when the user is in a non-acceleration state to a second angle of view based on an acceleration direction of the user. The present technology can be applied to, for example, an HMD.

20 Claims, 12 Drawing Sheets

(51) Int. Cl.
  *H04N 5/222* (2006.01)
  *H04N 5/225* (2006.01)
  *H04N 5/232* (2006.01)
  *G02B 27/01* (2006.01)

(52) U.S. Cl.
  CPC ......... *H04N 5/2253* (2013.01); *H04N 5/2257* (2013.01); *H04N 5/23258* (2013.01); *G02B 2027/0187* (2013.01)

(58) Field of Classification Search
  CPC .. G06T 19/00; G02B 27/017; G02B 27/0093; G02B 2027/0187; G06F 3/011; G06F 3/012; H04N 5/23258; H04N 5/2253; H04N 5/2257; H04N 5/2224
  See application file for complete search history.

(56) References Cited

U.S. PATENT DOCUMENTS

| | | | | |
|---|---|---|---|---|
| 10,078,917 | B1* | 9/2018 | Gaeta | G06F 3/04815 |
| 10,152,851 | B2* | 12/2018 | Gatta | G06F 1/163 |
| 10,163,255 | B2* | 12/2018 | Alpert | G06T 17/05 |
| 10,255,714 | B2* | 4/2019 | Mitchell | G06F 3/011 |
| 10,300,362 | B2* | 5/2019 | Reilly | G06F 3/147 |
| 10,380,799 | B2* | 8/2019 | Arsan | G06T 19/006 |
| 10,395,428 | B2* | 8/2019 | Stafford | G06T 7/246 |
| 10,482,662 | B2* | 11/2019 | Anderson | G06T 19/006 |
| 10,503,964 | B1* | 12/2019 | Valgardsson | G06T 19/006 |
| 10,518,172 | B2* | 12/2019 | Chen | A63F 13/212 |
| 10,553,036 | B1* | 2/2020 | Perez, III | G06F 3/04842 |
| 10,554,950 | B1* | 2/2020 | Curlander | H04N 13/332 |
| 10,594,936 | B2* | 3/2020 | Nakamura | G02B 27/017 |
| 10,617,956 | B2* | 4/2020 | Black | A63F 13/65 |
| 10,620,441 | B2* | 4/2020 | Van Der Auwera | G06F 3/012 |
| 10,636,188 | B2* | 4/2020 | Hariton | G06T 19/006 |
| 10,653,946 | B2* | 5/2020 | Wada | A63F 13/56 |
| 10,656,704 | B2* | 5/2020 | Schwartz | A63F 13/00 |
| 10,678,340 | B2* | 6/2020 | West | G02B 27/01 |
| 10,684,485 | B2* | 6/2020 | Stafford | G06T 19/006 |
| 10,691,202 | B2* | 6/2020 | van Hoff | G06Q 30/0263 |
| 10,724,874 | B2* | 7/2020 | Beaurepaire | G06F 3/011 |
| 10,751,621 | B2* | 8/2020 | Ratelle | G06T 19/20 |
| 10,930,075 | B2* | 2/2021 | Costa | G06T 19/006 |
| 10,931,941 | B2* | 2/2021 | Valdivia | G06F 3/011 |
| 10,936,537 | B2* | 3/2021 | Huston | G06T 17/00 |
| 10,955,665 | B2* | 3/2021 | Salter | G02B 27/017 |
| 10,974,148 | B2* | 4/2021 | Ikenoue | A63F 13/53 |
| 10,981,061 | B2* | 4/2021 | Benedetto | A63F 13/5258 |
| 11,024,088 | B2* | 6/2021 | Heinen | G06T 15/04 |
| 11,163,358 | B2* | 11/2021 | Marks | A63F 13/86 |
| 11,175,727 | B2* | 11/2021 | Nakayama | A63F 13/655 |
| 11,179,635 | B2* | 11/2021 | Platt | A63F 13/52 |
| 11,195,335 | B2* | 12/2021 | Watanabe | G06F 3/04883 |
| 11,216,907 | B2* | 1/2022 | Ogasawara | G06F 3/011 |
| 11,303,814 | B2* | 4/2022 | Pallamsetty | H04N 5/23293 |
| 11,314,089 | B2* | 4/2022 | Langner | G06F 3/013 |
| 2015/0138099 | A1* | 5/2015 | Major | H04W 4/027 345/173 |
| 2016/0027218 | A1* | 1/2016 | Salter | G06F 3/012 345/633 |
| 2017/0091993 | A1* | 3/2017 | Andrew | G06F 3/04812 |
| 2017/0221185 | A1* | 8/2017 | Inomata | G06T 5/002 |
| 2018/0061084 | A1* | 3/2018 | Mitchell | G06F 3/147 |
| 2018/0095636 | A1* | 4/2018 | Valdivia | G06F 3/012 |
| 2018/0182172 | A1* | 6/2018 | Vinmani | G06V 20/20 |
| 2018/0373348 | A1* | 12/2018 | Price | G06F 3/0308 |
| 2019/0147643 | A1* | 5/2019 | Turner | G06F 3/013 345/428 |
| 2019/0204599 | A1* | 7/2019 | Abbott | G06T 19/006 |
| 2019/0220088 | A1* | 7/2019 | Ishii | G06F 3/0334 |

FOREIGN PATENT DOCUMENTS

| | | |
|---|---|---|
| JP | 2017-076319 A | 4/2017 |
| JP | 2017-138701 A | 8/2017 |
| JP | 2017-182130 A | 10/2017 |
| JP | 6719308 B2 | 7/2020 |
| WO | 2015/122108 A1 | 8/2015 |
| WO | 2017/135129 A1 | 8/2017 |
| WO | 2018/012394 A1 | 1/2018 |

OTHER PUBLICATIONS

International Search Report and Written Opinion of PCT Application No. PCT/JP2019/009855, dated Apr. 23, 2019, 08 pages of ISRWO.

* cited by examiner

F I G. 7
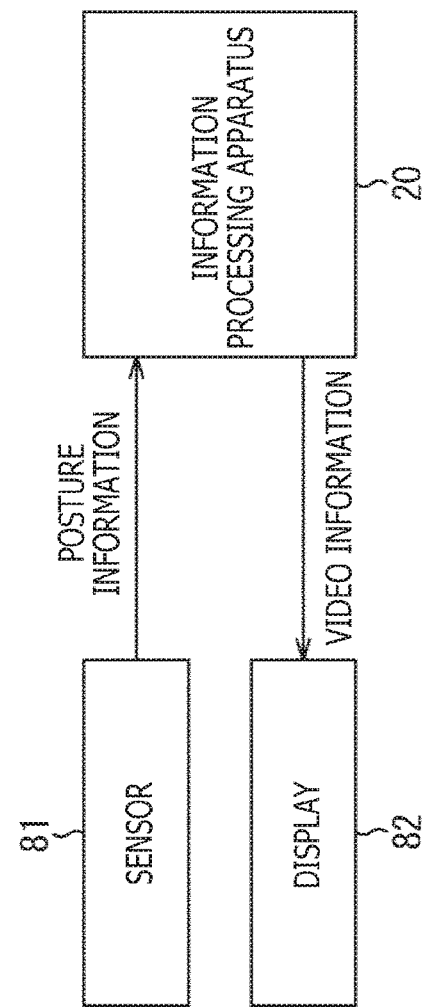

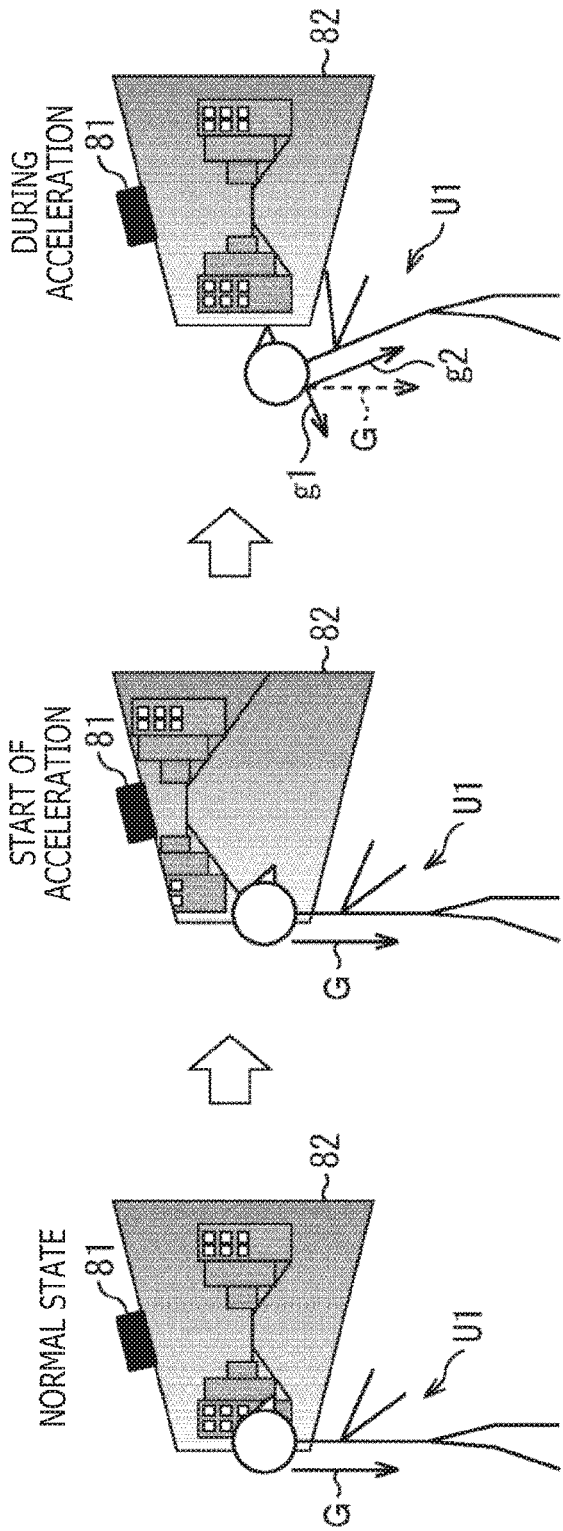

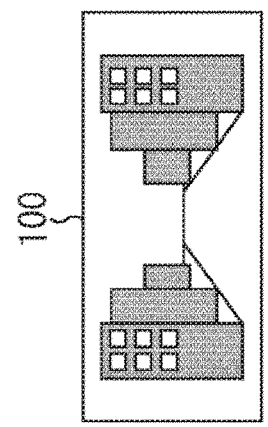
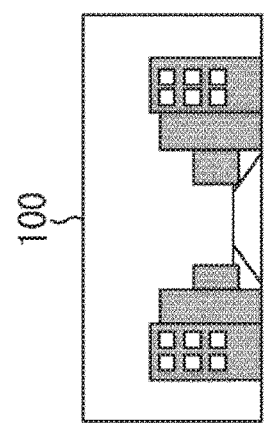
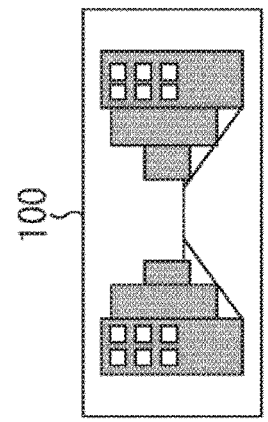
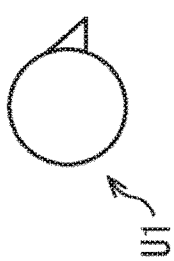
FIG. 9A
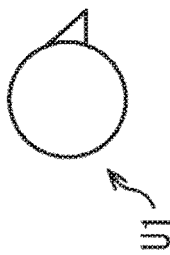
FIG. 9B
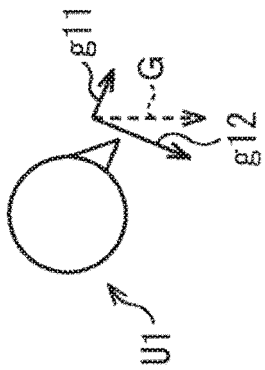
FIG. 9C

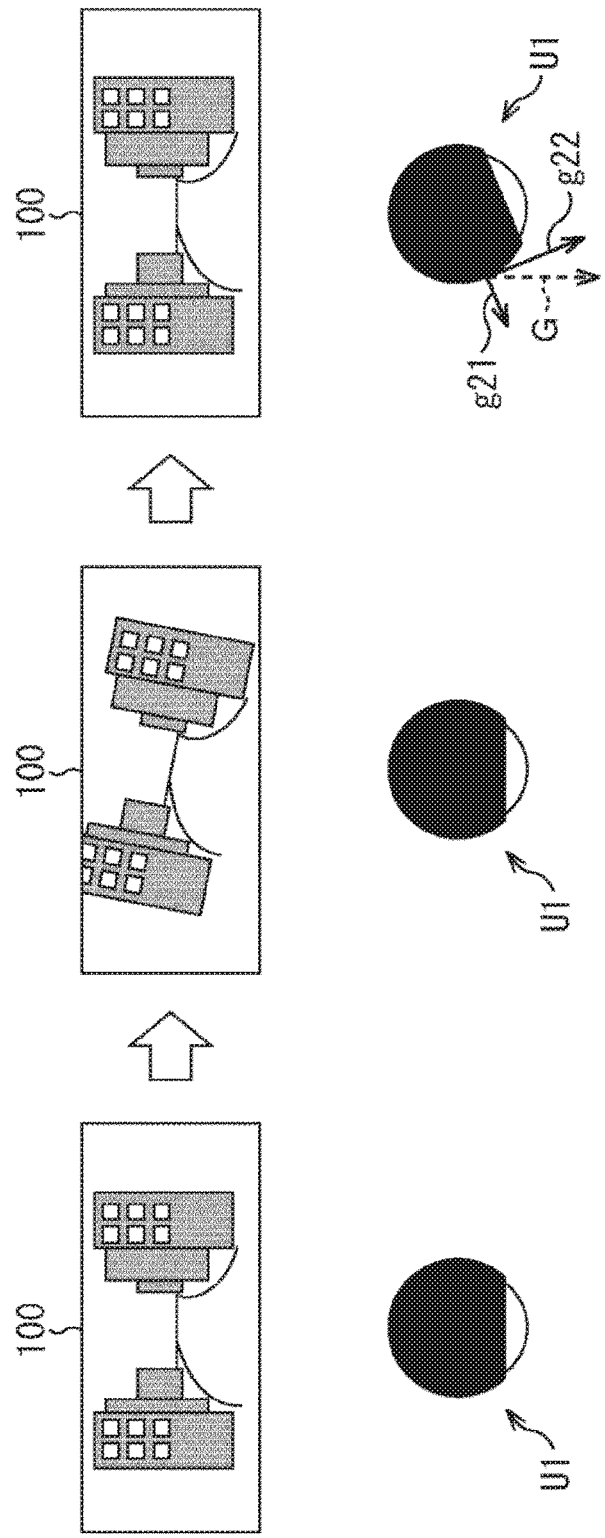

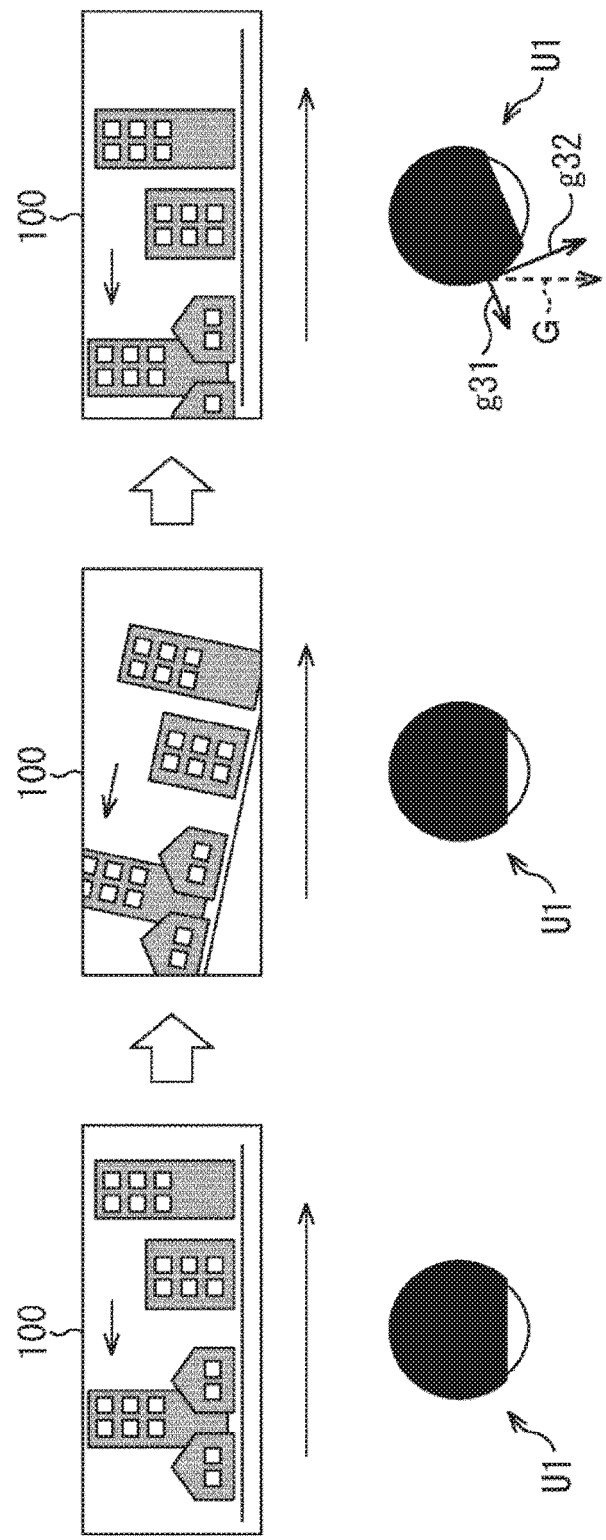

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/009855 filed on Mar. 12, 2019, which claims priority benefit of Japanese Patent Application No. JP 2018-057580 filed in the Japan Patent Office on Mar. 26, 2018. Each of the above-referenced applications is hereby incorporated herein by reference in its entirety.

TECHNICAL FIELD

The present technology relates to information processing apparatuses, information processing methods, and programs, and in particular, relates to an information processing apparatus, an information processing method, and a program that make it possible to eliminate or minimize VR sickness with an immersive feeling enhanced.

BACKGROUND ART

Heretofore, mechanisms have been considered for providing various experiences through presentation of first-person visual point-of-view images. Among them, there are technologies that reduce motion sickness caused by discrepancy between a presented image and a head movement, or the like.

For example, in PTL 1, disclosed is a technology which, in order to reduce screen shaking caused by the rotational movement of an imaging apparatus worn on the head of a user, makes a correction of rotating an image in a reverse direction, in response to a change of the direction of the user's line of sight.

Further, in PTL 2, disclosed is a technology which presents, to the head of a user wearing an HMD (Head-Mounted Display), a force sensation in response to a change on a video that the user is watching.

CITATION LIST

Patent Literature

[PTL 1]
 PCT Patent Publication No. 2015/122108
[PTL 2]
 Japanese Patent Laid-open No. 2017-182130

SUMMARY

Technical Problem

Further, nowadays, a VR (Virtual Reality) technology for presenting videos within a virtual space is known.

In this VR technology, when, for example, a user is travelling while accelerating in the virtual space, a video of the user's accelerating condition is presented, whereas there is no force applied to the user's body, and thus, the user may feel uncomfortable or may feel what is called VR sickness.

The present technology has been made in view of such a situation and makes it possible to eliminate or minimize the VR sickness with an immersive feeling enhanced.

Solution to Problem

An information processing apparatus according to the present technology includes a video generation section that, on the basis of head posture of a user, generates a video resulting from control of an angle of view of a virtual camera, the angle of view corresponding to a field of view of the user within a virtual space, and, when the user is in an acceleration state in the virtual space, the video generation section changes the angle of view of the virtual camera from a first angle of view at a time when the user is in a non-acceleration state to a second angle of view based on an acceleration direction of the user.

An information processing method according to the present technology is an information processing method including generating, by an information processing apparatus, on the basis of head posture of a user, a video resulting from control of an angle of view of a virtual camera, the angle of view corresponding to a field of view of the user within a virtual space, and when the user is in an acceleration state in the virtual space, changing, by the information processing apparatus, the angle of view of the virtual camera from a first angle of view at a time when the user is in a non-acceleration state to a second angle of view based on an acceleration direction of the user.

A program according to the present technology is a program that allows a computer to perform processing including generating, on the basis of head posture of a user, a video resulting from control of an angle of view of a virtual camera, the angle of view corresponding to a field of view of the user within a virtual space, and changing, when the user is in an acceleration state in the virtual space, the angle of view of the virtual camera from a first angle of view at a time when the user is in a non-acceleration state to a second angle of view based on an acceleration direction of the user.

In the present technology, on the basis of head posture of a user, a video resulting from control of an angle of view of a virtual camera, the angle of view corresponding to a field of view of the user within a virtual space, is generated, and, when the user is in an acceleration state in the virtual space, the angle of view of the virtual camera is changed from a first angle of view at a time when the user is in a non-acceleration state to a second angle of view based on an acceleration direction of the user.

Advantageous Effects of Invention

The present technology makes it possible to eliminate or minimize the VR sickness with an immersive feeling enhanced.

Note that effects of the present technology are not necessarily limited to the effects described here and may be any effects described in the present disclosure.

BRIEF DESCRIPTION OF DRAWINGS

FIG. 7 is a block diagram illustrating an example of a configuration of the video presentation system of FIG. 6.

FIGS. 8A, 8B, and 8C are diagrams illustrating an example of a video presentation in the video presentation system of FIG. 6.

FIGS. 9A, 9B, and 9C are diagrams illustrating an example of a video presentation in another acceleration state.

FIGS. 10A, 10B, and 10C are diagrams illustrating an example of a video presentation in still another acceleration state.

FIGS. 11A, 11B, and 11C are diagrams illustrating an example of a video presentation in yet another acceleration state.

DESCRIPTION OF EMBODIMENTS

Hereinafter, a mode for practicing the present disclosure (hereinafter referred to as an embodiment) will be described. Here, the description will be made in the following order.

1. Outline of Video Presentation Provided by Technology according to Present Disclosure 2. First Configuration of Video Presentation System (HMD)

3. Second Configuration of Video Presentation System (Single Display)

4. Video Presentations in Other Acceleration States

5. Other Configurations of Video Presentation System

<1. Outline of Video Presentation Provided by Technology According to Present Disclosure>

A video presentation system, to which the technology according to the present disclosure (the present technology) is applied, presents videos resulting from using a visual righting reflex that causes a human being to attempt to return to his or her original posture.

The righting reflex is one of postural reflexes that cause animals to attempt to maintain their postures. As the visual righting reflex, induction in response to visual stimulation causes a human being to attempt to keep his or her head position normal.

Figure 1:
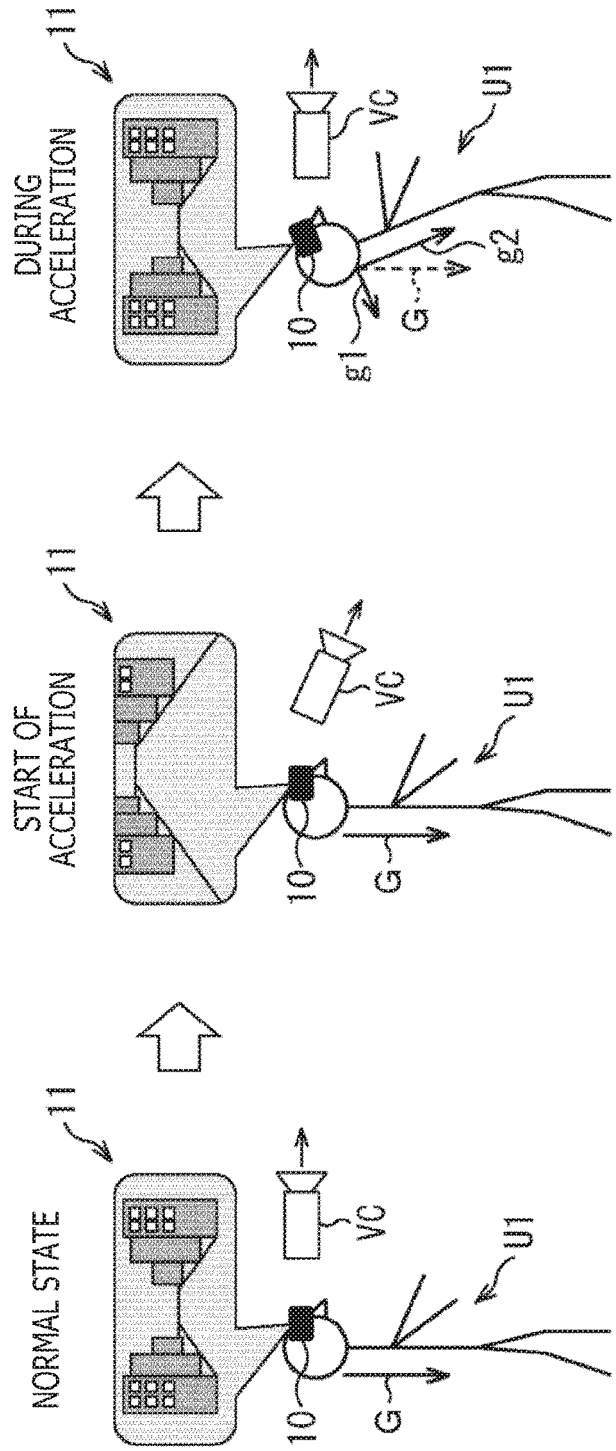
FIGS. 1A, 1B, and 1C are diagrams illustrating the outline of a video presentation provided by the technology according to the present disclosure.

FIGS. 1A, 1B, and 1C are diagrams illustrating the outline of a video presentation presented by the image presentation system to which the present technology is applied.

In each of FIGS. 1A, 1B, and 1C, there is illustrated a condition in which a user U1 wearing an HMD 10 on his or her head is watching videos.

The HMD 10 is configured as a display apparatus for VR and includes a non-transparent type display section 11. The display section 11 presents a video serving as a field of view of the user U1 within a virtual space (hereinafter referred to as a VR space). In other words, the display section 11 presents a video captured by a virtual camera VC and corresponding to the field of view of the user U1 within the VR space.

Particularly, in the present embodiment, the video presented on the display section 11 serves as a first-person visual point-of-view video including a state in which the user U1 is travelling at a given acceleration in the VR space. Specifically, the display section 11 presents a video from a view point positioned at a vehicle driver's seat, or a video from a view point of a person skiing, snowboarding, or surfing.

In the following, a state in which acceleration is forcibly applied to the user U1, for example, when the user U1 travels at a given acceleration in the VR space will be referred to as "an acceleration state," and a state in which the user U1 is at a stop or is travelling at a constant speed will be referred to as "a non-acceleration state."

The acceleration state includes a state in which the user U1 is travelling at a given acceleration in the VR space by means of a travelling object independent of the user U1. The travelling object may be the abovementioned vehicle, an aircraft, or a train, and further may be a ride that the user U1 rides in the VR space, such as a magic carpet, or a magic broom which is unique to the virtual space, or equipment (a board) for use in any one of the abovementioned skiing, snowboarding, or surfing, and the like. Moreover, the travelling object may be any one of an escalator and an elevator car overlooking the outside, which is utilized by a user in the VR space.

Further, the acceleration state may be expanded to include a state in which, in the VR space, a vibration is forcibly applied to the user U1 (the user U1 is caused to shake) by earthquake or an earthquake generation car. Moreover, the acceleration state may be expanded to include a state in which a force generated by an event is applied to the user U1, examples of the event including an event in which the user U1 is pulled by a character or the like that appears in the VR space, an event in which the user U1 is blown away by wind, an event in which the user U1 is sucked into something, and any other similar events.

As described later, in the video presented on the display section 11, a displayed region (a field of view of the user U1 within the VR space) is changed in response to the change of (head) posture of the user U1, or the like. The video presented on the display section 11, therefore, serves as, for example, an entire celestial sphere video, or a 3D-model video resulting from modeling the virtual space, which can be displayed as any one of videos of regions outside a currently displayed region (i.e., videos of regions on the upper, lower, left, and right sides relative to the currently displayed region).

FIG. 1A illustrates a condition in which, in the VR apace, the user U1 rides a vehicle and is in a non-acceleration state in which the user U1 is travelling forward at a constant speed, for example. The display section 11 is presenting a video serving as the field of view of the user U1 within the VR space and captured by the virtual camera VC with its angle of view set in a front forward direction. Gravity G is applied to the head of the user U1 in the direction of the gravity (downward in FIGS. 1A 1B, and 1C).

FIG. 1B illustrates a condition in which the user U1 has moved from the state of A of FIGS. 1A and 1s, in the VR space, in an acceleration state in which the user U1 is travelling forward while starting acceleration. At this time, the display section 11 presents a video serving as a field of view of the user U1 within the VR space and captured by the virtual camera VC with its angle of view set in a direction inclined downward from the front forward direction. That is, the field of view of the user U1 within the VR space is caused to incline downward from the front forward direction.

Incidentally, in the case where, in the real space, a user rides a vehicle and travels forward while accelerating, a force that pulls his or her body backward arises. The user attempts to maintain the body against the force by straining his or her back and legs.

In the conventional VR technology, however, there has been a situation in which, irrespective of whether a user is in the non-acceleration state or in the acceleration state in the VR space, the user continues to watch videos in the same posture.

Meanwhile, in the video presentation system to which the present technology is applied, when the user U1 is in the acceleration state with acceleration applied forward in the VR space, as illustrated in FIG. 1B, a presented video is caused to incline downward (toward the side of the feet of the user U1) from the front forward direction. This operation gives the user U1 an illusion that his or her head has been tilted forward, and this illusion induces a visual righting reflex that causes the user U1 to attempt to return to his or her original posture.

Consequently, as illustrated in C of FIG. 1C, the user U1 attempts to tilt his or her head backward by bending his or her body backward in order to maintain his or her posture (in order to attempt to return his or her field of view to the front forward direction). This behavior causes the gravity G applied to the head of the user U1 to be decomposed into a force g1 that is applied to the head backward and a force g2 that is applied thereto in a direction along his or her body trunk.

That is, the behavior in which the user U1 bends his or her body backward shifts the center of gravity of the body, and thus, as a result, the user U1 feels a force that pulls the body backward. The user U1 attempts to maintain his or her posture against the force by straining his or her back and legs. This situation in which the user U1 attempts to maintain his or her posture results in a similar situation in a case in which, in the real space, the user U1 rides a vehicle and is traveling forward while accelerating.

In addition, in a state of FIG. 1C, the display section 11 presents a video captured by the virtual camera VC with its angle of view returned to the front forward direction in response to the backward tilt of the head of the user U1.

In this way, in the video presentation system to which the present technology is applied, a user who is travelling while accelerating in the VR space can naturally feel a force applied to the user by the acceleration.

<2. First Example of Configuration of Video Presentation System>

(Example of Configuration of Video Presentation System)

Figure 2:
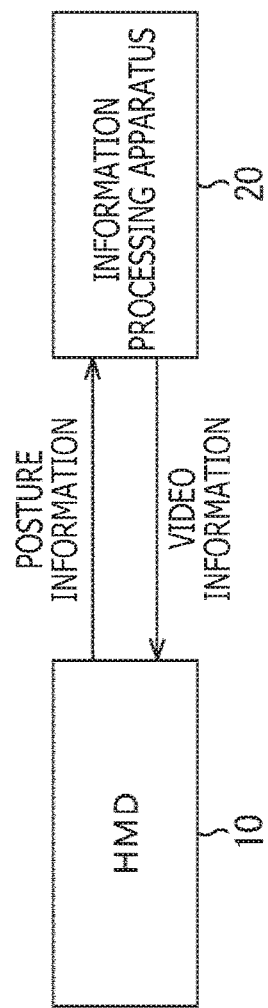
FIG. 2 is a block diagram illustrating an example of a configuration of a video presentation system to which the present technology is applied.

FIG. 2 is a block diagram illustrating an example of a configuration of a video presentation system to which the present technology is applied and which implements the video presentation having been described with reference to FIGS. 1A 1B, and 1C.

The video presentation system of FIG. 2 includes the HMD 10 and an information processing apparatus 20

The HMD 10 is worn on the head of a user and supplies the information processing apparatus 20 with posture information representing head posture of the user. Further, the HMD 10 presents thereon videos watched by the user on the basis of video information from the information processing apparatus 20.

The information processing apparatus 20 is configured as, for example, a PC (Personal Computer) or the like. The information processing apparatus 20 generates videos on the basis of the posture information from the HMD 10 and supplies the HMD 10 with the video information representing the videos.

(Example of Configuration of Information Processing Apparatus)

Next, an example of a configuration of the information processing apparatus 20 will be described with reference to FIG. 3.

Figure 3:
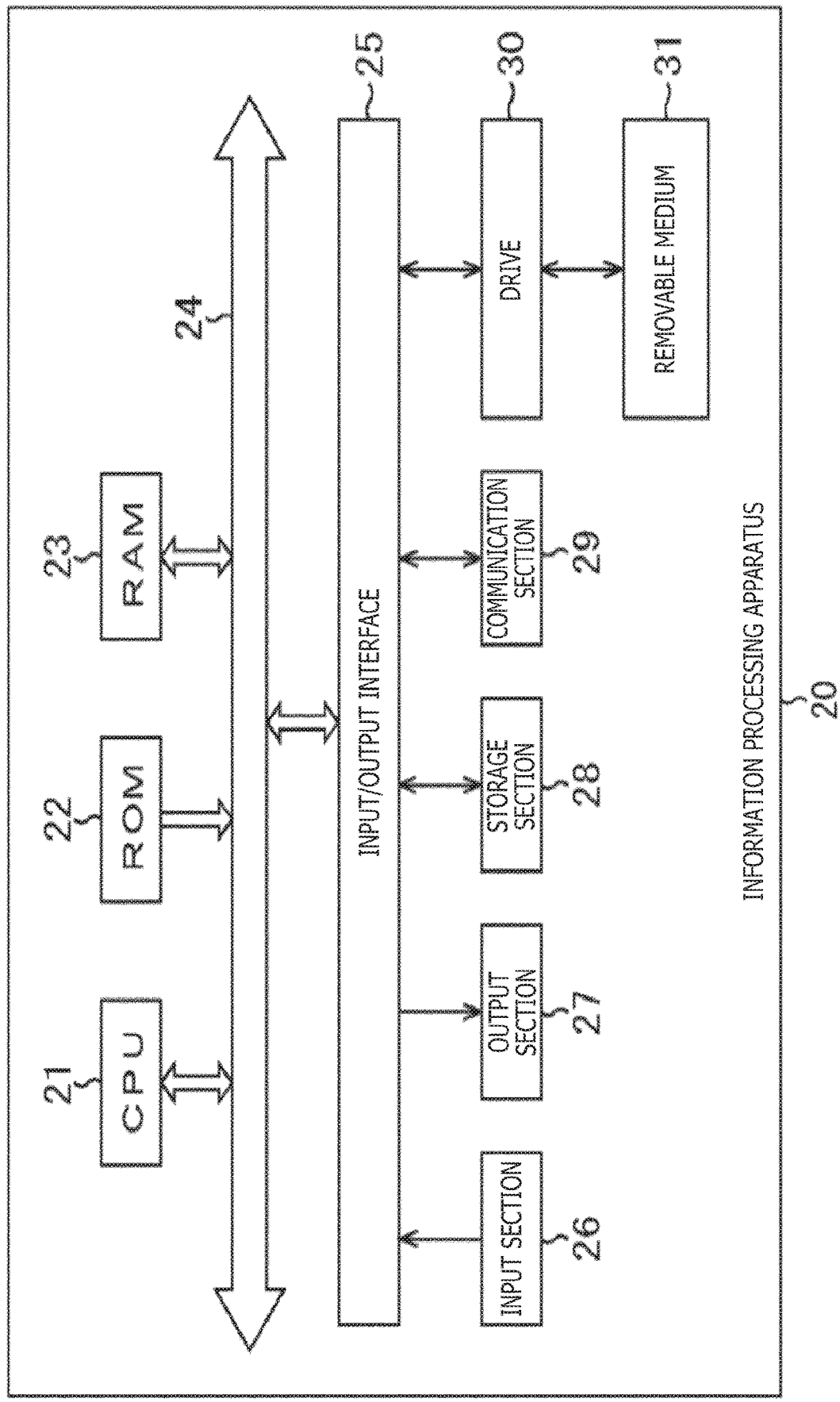
FIG. 3 is a block diagram illustrating an example of a configuration of an information processing apparatus.

As illustrated in FIG. 3, a CPU (Central Processor Unit) 21, a ROM (Read Only Memory) 22, and a RAM (Random Access Memory) 23 are connected to one another via a bus 24.

The CPU 21 executes various processes for implementing functions included in the information processing apparatus 20 in accordance with programs stored in the ROM 22 or programs loaded in the RAM 23. Pieces of data needed in the execution of the various processes by the CPU 21 and any other kind of data are also stored in the RAM 23 as needed.

The bus 24 is also connected to an input/output interface 25.

The input/output interface 25 is connected to an input section 26, an output section 27, a storage section 28, and a communication section 29.

The input section 26 includes keys, buttons, a touch panel, a microphone, and any other component, and the output section 27 includes a display, a speaker, and any other component.

The storage section 28 includes a non-volatile memory and any other storage component. The storage section 28 stores therein, in addition to the programs executed by the CPU 21, various kinds of data for the videos presented on the HMD 10 and any other kind of data.

The communication section 29 includes a network interface and any other component. The communication section 29 performs communication via a wireless line or a wired line, with the HMD 10.

The input/output interface 25 is also connected to a drive 30 when necessary, to which a removable medium 32 implemented by a semiconductor memory or any other storage medium is attached as needed. Programs having been read from the removable medium 32 are installed into the storage section 28 when necessary.

(Example of Configuration of Functions of Video Presentation System)

Next, an example of a configuration of functions of the video presentation system will be described with reference to FIG. 4.

Figure 4:
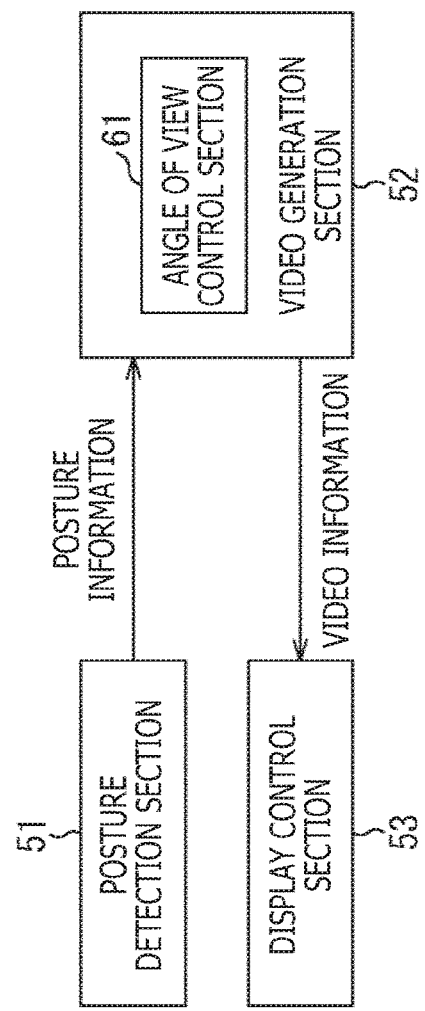
FIG. 4 is a block diagram illustrating an example of a configuration of functions of the video presentation system.

The video presentation system of FIG. 4 includes a posture detection section 51, a video generation section 52, and a display control section 53.

The posture detection section 51 is supposed to be implemented by the HMD 10, and the video generation section 52 and the display control section 53 are supposed to be implemented by the information processing apparatus 20. Here, the display control section 53 may be implemented by the HMD 10.

The posture detection section 51 detects head posture of a user wearing the HMD 10 and supplies the video generation section 52 with posture information representing the posture. The HMD 10 includes, for example, an acceleration sensor, and the posture detection section 51 detects the head posture of the user on the basis of the output of the acceleration sensor.

The video generation section 52 generates videos to be presented to the user, on the basis of the posture information from the posture detection section 51.

The video generation section 52 includes an angle of view control section 61. The angle of view control section 61 controls an angle of view of a virtual camera, which corresponds to a field of view of the user within the VR space.

Specifically, when the user is in the acceleration state in the VR space, the angle of view control section 61 changes the angle of view of the vertical camera from a first angle of view at the time when the user is in the non-acceleration state to a second angle of view based on an acceleration direction of the user.

Here, the second angle of view is defined as an angle of view, such as that illustrated in FIG. 1B, by which a visual righting reflex guides the head posture of the user in the direction of a force applied to the user who is, in the real space, in the same state as the acceleration state.

Further, the angle of view control section 61 controls the angle of view of the virtual camera on the basis of the posture information from the posture detection section 51. For example, the angle of view control section 61 changes the angle of view of the virtual camera so as to bring the relevant angle of view close to the first angle of view from the second angle of view, as illustrated in FIG. 1C, according to the change of the head posture at the time when the user is in the acceleration state in the VR space.

In this way, the video generation section 52 generates a video resulting from the control of the angle of view of the virtual camera by the angle of view control section 61. Video information representing the generated video is supplied to the display control section 53.

The display control section 53 supplies the HMD 10 with the video information from the video generation section 52 and controls the display of the video represented by the video information.

(Flow of Angle of View Control Processing on Video)

Figure 5:
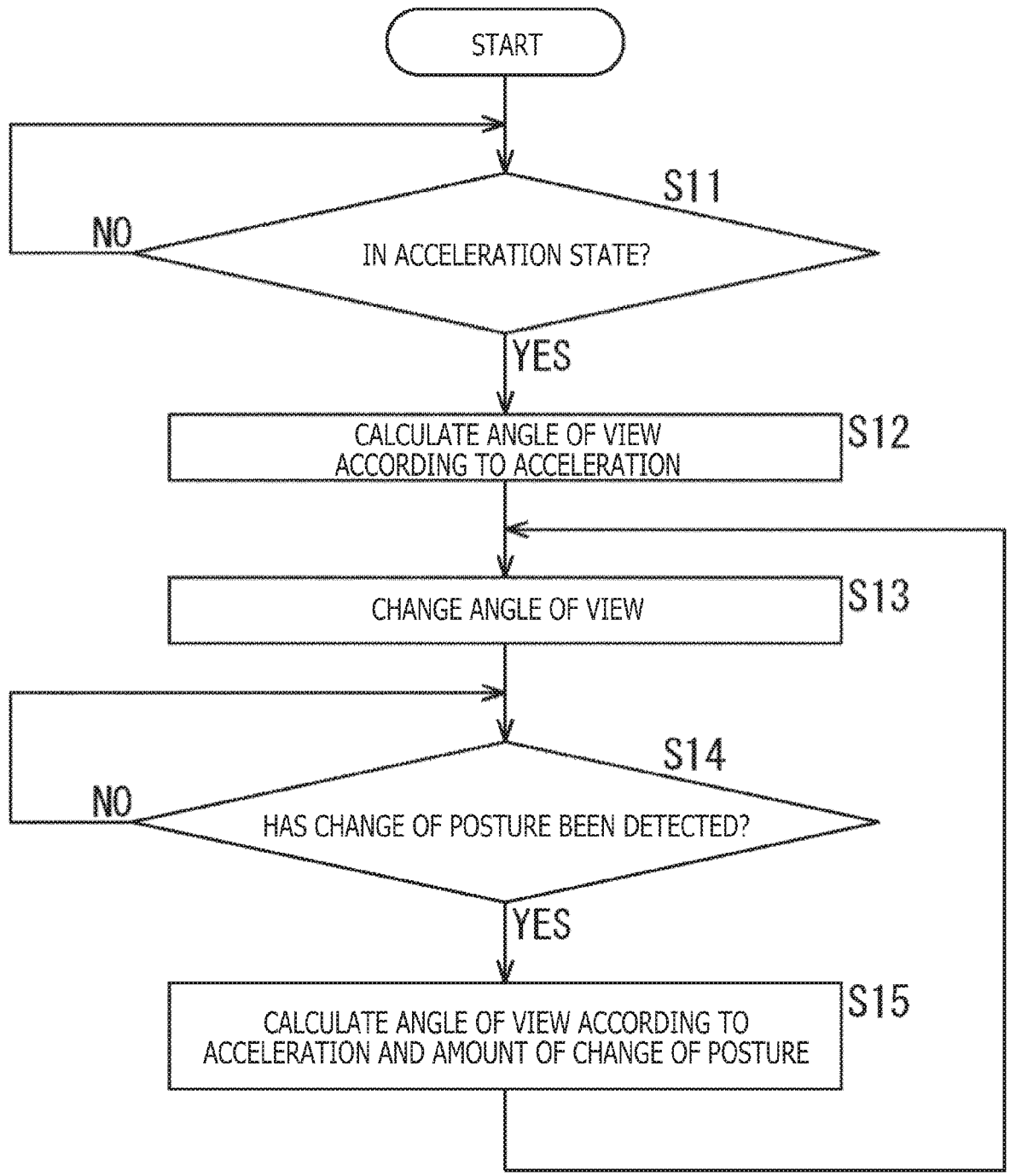
FIG. 5 is a flowchart describing angle of view control processing on videos.

Next, angle of view control processing on videos presented on the HMD 10 will be described with reference to a flowchart of FIG. 5. The processing of FIG. 5 is started upon start of the presentation of the videos on the HMD 10.

In step S11, the angle of view control section 61 determines whether or not the user is in the acceleration state in the VR space, on the basis of videos generated by the video generation section 52.

Step S11 is repeated until it is determined that the user is in the acceleration state, and when it is determined that the user is in the acceleration state, the processing proceeds to step S12.

In step S12, the angle of view control section 61 calculates an angle of view of the virtual camera according to the magnitude of acceleration in a video presented in the acceleration state.

In the real space, the larger a forward acceleration is, the stronger a force that pulls the body of the user backward is. Thus, the larger the forward acceleration is in the VR space, the more largely it is desirable to cause the user to bend his or her body backward in order to allow the user to bodily sense the acceleration.

Thus, in the present embodiment, the larger a forward acceleration is in the VR space, more largely the angle of view of the virtual camera is caused to incline downward from the front forward direction.

When acceleration in a video presented in the acceleration state is denoted by a and an amount of change of an angel of view of the virtual camera from that in the non-acceleration state is denoted by d1, the angle of view change amount d1 is represented by the following formula, using a given coefficient k1.

$$d1 = k1 \times a$$

When, in this way, the angle of view (the change amount) has been calculated according to the magnitude of the acceleration in the video presented in the acceleration, the processing proceeds to step S13.

In step S13, the angle of view control section 61 changes the angle of view of the virtual camera on the basis of the calculated angle of view change amount d1.

In step S14, the angle of view control section 61 determines whether or not a change of the head posture of the user has been detected, on the basis of the posture information from the posture detection section 51.

Step S14 is repeated until it is determined that the change of the posture has been detected, and upon determination of the detection of the change of the posture, the processing proceeds to step S15.

In step S15, the angle of view control section 61 calculates an angle of view of the virtual camera again according to the acceleration in the video presented in the acceleration state and an amount of change of the head posture of the user.

In the case where, upon glance of a video inclined downward from the front forward direction, a user who is in the forward acceleration state has been caused to bend his or her body backward by a visual righting reflex, the downwardly inclined angle of view of the virtual camera is caused to return to the front forward direction according to a degree of the backward bending of the body (an amount of backward bending).

When, for example, a position and an orientation of the head of a user who is in the non-acceleration state are used as reference points, an amount of backward bending of the user's body is defined by the product of h1, i.e., an amount of traveling backward from the position, and h2, i.e., an amount of rotation upward from the orientation (an angle change amount).

An angle of view change amount d2 at the time when the angle of view of the virtual camera is caused to return to the front forward direction according to the amount of backward bending of the user's body is represented by the following formula, using h1×h2, i.e., the abovementioned amount of backward bending of the user's body, and a given coefficient k2.

$$d2 = k2 \times h1 \times h2$$

Consequently, an angle of view change amount d3, i.e., an amount of change of the angle of view from that in the non-acceleration state, which is calculated according to the change of head posture of the user, is presented by the following formula, using the angle of view change amount d1, the angle of view change amount d2, and a given coefficient k3.

$$d3 = k3(d1 - d2)$$

When, in this way, the angle of view (the change amount) has been calculated according to the change of head posture of the user, the processing returns to step S13, and there, the angle of view of the virtual camera is caused to change on the basis of the calculated angle of view change amount d3.

That is, a behavior in which the user bends his or her body backward so as to cause a value of the angle of view change amount d2 to be the same as that of the angle of view change amount d1 causes the value of the angle of view change amount d3 to be equal to 0, thereby causing the angle of view of the virtual camera to be the same angle of view as the angle of view in the non-acceleration state.

At this time, the field of view of the user within the VR space is oriented to the front forward direction, and thus, the user maintains the posture without further bending the body backward. Consequently, this configuration allows the user to feel a force that pulls the body backward, and reproduces the state in which the user is travelling at the constant acceleration in the real space. That is, h1×h2 at this time, i.e., the amount of backward bending of the user's body at this time, can be regarded to be an ideal backward bending amount that allows the user to bodily sense the acceleration.

According to the above-described processing, when a user travels while accelerating in the VR space in a game, a simulation, or the like, the user can naturally feel a force applied to the user by the acceleration, and thus, this configuration makes it possible to eliminate or minimize the VR sickness with an immersive feeling enhanced. This condition enables the user to enjoy a more realistic experience in the VR space.

In addition, in the abovementioned processing, employed is a configuration in which the larger acceleration applied to the user who is in the acceleration state in the VR space is, the larger an amount of change downward from the front forward direction with respect to the angle of view of the virtual camera is.

For example, in the case where a vehicle that a user rides in the real space travels with acceleration continuing, the control of driving becomes impossible, and a collision with another vehicle or rolling may happen.

Thus, in the case where a calculated amount of change of the angle of view of the virtual camera exceeds a predetermined threshold value because of the occurrence of an event in which, in the VR space, acceleration applied to the user in the acceleration state exceeds a constant acceleration, or any other similar event, a video different from such an abovementioned acceleration-state video may be generated and presented.

For example, in the case where a calculated amount of change of the angle of view of the virtual camera has exceed a predetermine threshold value, a presented video may be switched from a video of a start-of-acceleration state, such as that presented on the display section 11 in FIG. 1B, to a video of the collision with another vehicle or a video of the rolling.

Such a video presentation makes it possible to give a further enhanced immersive feeling to a user.

In the above, the configuration of the video presentation system in which an HMD serves as a display apparatus has been described, however, a single display may be allowed to serve as the display apparatus.

<3. Second Example of Configuration of Video Presentation System>

Figure 6:
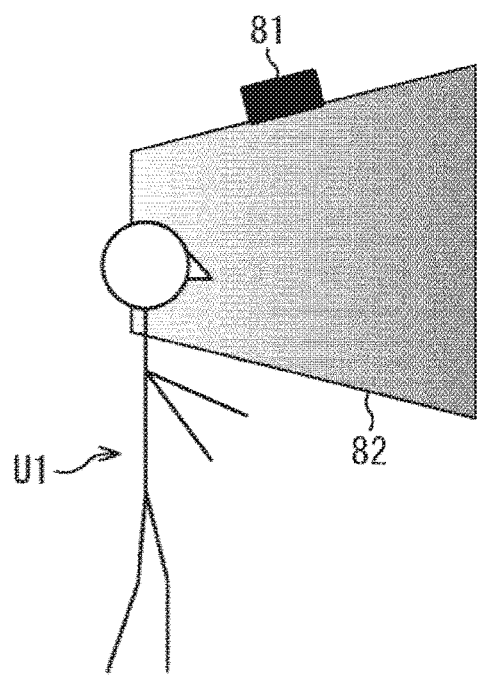
FIG. 6 is a diagram illustrating another example of a configuration of the video presentation system.

FIG. 6 is a diagram illustrating an example of a configuration of a video presentation system in which a single display serves as a display apparatus.

FIG. 6 illustrates a condition in which the user U1 is watching videos in front of a display 82 on which a sensor 81 is mounted. The body position of the user U1 may be a standing position or a sitting position.

The sensor 81 includes an RGB camera, a depth sensor, and any other component and detects posture of the user U1 by means of skeleton recognition and the like for the user U1.

The display 82 is configured as a television receiver with a large screen, a large type screen, or the like. The display 82 presents a video serving as a field of view of the user U1 within the VR space.

FIG. 7 is a block diagram illustrating an example of a configuration of the video presentation system of FIG. 6.

The video presentation system of FIG. 7 includes the sensor 81, the display 82, and the information processing apparatus 20.

The sensor 81 makes skeleton recognition and the like for the user U1 and supplies the information processing apparatus 20 with resultant posture information representing head posture of the user U1.

The information processing apparatus 20 generates videos on the basis of the posture information from the sensor 81 and supplies the display 82 with video information representing the resultant videos.

The display 82 presents videos to be watched by the user U1, on the basis of the video information from the information processing apparatus 20.

FIGS. 8A, 8B, and 8C are diagrams illustrating an example of a video presentation provided by the video presentation system of FIG. 6 and FIG. 7.

FIG. 8A illustrates a condition in which, in the VR space, the user U1 rides a vehicle and is in a non-acceleration state in which the user U1 is travelling forward at a constant speed, for example. The display 82 is presenting a video serving as a field of view of the user U1 within the VR space and captured by an unillustrated virtual camera with its angle of view set in a front forward direction. Gravity G is applied to the head of the user U1 in the direction of gravity (downward in FIGS. 8A, 8B, and 8C).

FIG. 8B illustrates a condition in which the user U1 has moved from the state of FIG. 8A and is, in the VR space, in an acceleration state in which the user U1 is travelling forward while starting acceleration. At this time, the display 82 presents a video serving as a field of view of the user U1 within the VR space and captured by the unillustrated virtual camera with its angle of view set in a direction inclined downward from the front forward direction. That is, the field of view of the user U1 within the VR space is caused to incline downward from the front forward direction.

This operation gives the user U1 an illusion that his or her head has been inclined forward, and this illusion induces a visual righting reflex that causes the user U1 to attempt to return to his or her original posture.

Consequently, as illustrated in FIG. 8C, the user U1 attempts to tilt his or her head backward by bending his or her body backward in order to maintain his or her posture (in order to attempt to return his or her field of view to the front forward direction). This behavior causes the gravity G applied to the head of the user U1 to be decomposed into a force g1 that is applied to the head backward and a force g2 that is applied thereto in a direction along his or her body trunk.

That is, the behavior in which the user U1 bends his or her body backward shifts the center of gravity of the body, and thus, as a result, the user U1 feels a force that pulls the body backward. The user U1 attempts to maintain his or her posture against the force by straining his or her back and legs. This situation in which the user U1 attempts to maintain his or her posture results in a similar situation in a case in which, in the real space, the user U1 rides a vehicle and is traveling forward while accelerating.

Here, in a state of FIG. 8C, the display 82 presents a video captured by the unillustrated virtual camera with its angle of view returned to the front forward direction in response to the backward tilt of the head of the user U1.

In this way, even in the video presentation system of FIG. 6 and FIG. 7, when a user travels while accelerating in the VR space, the user can naturally feel a force applied to the user by the acceleration, and thus, this configuration makes it possible to eliminate or minimize the VR sickness with an immersive feeling enhanced.

<4. Video Presentations in Other Acceleration States>

In the above, an example of a video presentation at the time when a user is in the forward acceleration state in the VR space has been described, however, an acceleration direction of the user in the VR space is not limited to the forward direction. In the following, an example of a video presentation at the time when the user is in other acceleration states will be described.

(Backward Acceleration State)

FIGS. 9A, 9B, and 9C are diagrams illustrating an example of a video presentation at the time when a user is in a backward acceleration state. Note that the backward acceleration state includes not only a state in which the user is travelling backward while accelerating, as a matter of course, but also a state in which the user is travelling forward while decelerating.

FIG. 9A illustrates a condition in which, in the VR state, the user U1 rides a vehicle and is in a non-acceleration state in which the user U1 is travelling forward at a constant speed, for example. A display apparatus 100 presents a video serving as a field of view of the user U1 within the VR space and captured by an unillustrated camera with its angle of view set in the front forward direction. The display apparatus 100 may be configured as an HMD or a single display.

Incidentally, although, in FIGS. 9A, 9B, and 9C, the head (face) of the user U1 faces the right-hand side, the user U1 is supposed to be actually located directly opposite to a display section of the display apparatus 100.

FIG. 9B illustrates a condition in which the user U1 has moved from the state of FIG. 9A and is, in the VR space, in a backward acceleration state in which the user U1 is travelling forward while decelerating. At this time, the display apparatus 100 presents a video serving as a field of view of the user U1 within the VR space and captured by the unillustrated virtual camera with its angle of view set in a direction inclined upward from the front forward direction. That is, the field of view of the user U1 within the VR space is caused to incline upward from the front forward direction.

This operation gives the user U1 an illusion that his or her head has been inclined backward, and this illusion induces a visual righting reflex that causes the user U1 to attempt to return to his or her original posture.

Consequently, as illustrated in FIG. 9C, the user U1 attempts to tilt his or her head forward by bending his or her body forward in order to maintain his or her posture (in order to attempt to return his or her field of view to the front forward direction). This behavior causes the gravity G applied to the head of the user U1 to be decomposed into a force g11 that is applied to the head forward and a force g12 that is applied thereto in a direction along his or her body trunk.

That is, the behavior in which the user U1 bends his or her body forward shifts the center of gravity of the body, and thus, as a result, the user U1 feels a force that pulls the body forward. The user U1 attempts to maintain his or her posture against the force by straining his or her abdomen and legs. This situation in which the user U1 attempts to maintain his or her posture results in a similar situation in a case in which, in the real space, the user U1 rides a vehicle and is traveling forward while decelerating.

Here, in a state of FIG. 9C, the display apparatus 100 presents a video captured by the unillustrated virtual camera with its angle of view returned to the front forward direction in response to the forward tilt of the head of the user U1.

In this way, in the video presentation system according to the present technology, even in the case where a user travels while decelerating in the VR space, the user can naturally feel a force applied to the user by the deceleration, and thus, this configuration makes it possible to eliminate or minimize the VR sickness with an immersive feeling enhanced.

(Acceleration State with Turning Involved)

FIGS. 10A, 10B, and 10C are diagrams illustrating an example of a video presentation at the time when a user is in an acceleration state with turning involved. The acceleration state with turning involved is a state in which the user is travelling forward (or backward) in such a way as to curve around a corner to a rightward (or leftward) direction.

FIG. 10A illustrates a condition in which, in the VR space, the user U1 rides a vehicle and is in a non-acceleration state in which the user U1 is travelling forward at a constant speed, for example. The display apparatus 100 is presenting a video serving as a field of view of the user U1 within the VR space and captured by an unillustrated virtual camera with its angle of view set in a front forward direction.

FIG. 10B illustrates a condition in which the user U1 has moved from the state of FIG. 10A and is, in the VR space, in an acceleration state with turning involved, in which the user U1 is travelling forward while turning to the right. At this time, the display apparatus 100 presents a video serving as a field of view of the user U1 within the VR space and captured by the unillustrated virtual camera with its angle of view rotated to the inner side of a turning direction (i.e., to the right). That is, the horizontal direction of the field of view of the user U1 within the VR space is caused to incline to the right.

This operation gives the user U1 an illusion that his or her head has been tilted rightward, and this illusion induces a visual righting reflex that causes the user U1 to attempt to return to his or her original posture.

Consequently, as illustrated in FIG. 10C, the user U1 attempts to tilt his or her head leftward by leaning his or her body leftward in order to maintain his or her posture (in order to attempt to return the inclined horizontal direction of his or her field of view to the original direction). This behavior causes the gravity G applied to the head of the user U1 to be decomposed into a force g21 that is applied to the head leftward and a force g22 that is applied thereto in a direction along his or her body trunk.

That is, the behavior in which the user U1 leans his or her body leftward shifts the center of gravity of the body, and thus, as a result, the user U1 feels a force that pulls the body leftward. The user U1 attempts to maintain his or her posture against the force by straining his or her body and neck. This situation in which the user U1 attempts to maintain his or her posture results in a similar situation in a case in which, in the real space, the user U1 rides a vehicle and is traveling while turning to the right.

In addition, in a state of FIG. 10C, the display apparatus 100 presents a video captured by the unillustrated virtual camera with the rotation of its angle of view returned to the original angle of view in response to the leftward tilt of the head of the user U1.

In this way, in the video presentation system according to the present technology, even in the case where a user travels while turning in the VR space, the user can naturally feel a force applied to the user by the turning, and thus, this configuration makes it possible to eliminate or minimize the VR sickness with an immersive feeling enhanced.

(Lateral Acceleration State)

FIGS. 11A, 11B, and 11C are diagrams illustrating an example of a video presentation at the time when a user is in a lateral acceleration state. The lateral acceleration state is a state in which the user is travelling while accelerating (or decelerating) rightward (or leftward).

FIG. 11A illustrates a condition in which, in the VR apace, the user U1 rides a vehicle and is in a non-acceleration state in which the user U1 is travelling rightward as viewed from the user U1 at a constant speed. The display apparatus 100 is presenting a video serving as a field of view of the user U1 within the VR space and captured by an unillustrated virtual camera with its angle of view set directly opposite to the left side of a forward travelling direction of a train. Thus, in this example, the video captured by the virtual camera is moving leftward relative to the angle of view.

FIG. 11B illustrates a condition in which the user U1 has moved from the state of FIG. 11A and is, in the VR space, in an acceleration state in which the user U1 is travelling rightward while accelerating. At this time, the display apparatus 100 presents a video serving as a field of view of the user U1 within the VR space and captured by the unillustrated virtual camera with its angle of view rotated to the side of a accelerating direction (i.e., to the right). That is, the horizontal direction of the field of view of the user U1 within the VR space is caused to incline to the right.

This operation gives the user U1 an illusion that his or her head has been tilted rightward, and this illusion induces a visual righting reflex that causes the user U1 to attempt to return to his or her original posture.

Consequently, as illustrated in FIG. 11C, the user U1 attempts to tilt his or her head leftward by leaning his or her body leftward in order to maintain his or her posture (in order to attempt to return the inclined horizontal direction of his or her field of view to the original direction). This behavior causes the gravity G applied to the head of the user U1 to be decomposed into a force g31 that is applied to the head leftward and a force g32 that is applied thereto in a direction along his or her body trunk.

That is, the behavior in which the user U1 leans his or her body leftward shifts the center of gravity of the body, and thus, as a result, the user U1 feels a force that pulls the body leftward. The user U1 attempts to maintain his or her posture against the force by straining his or her body and neck. This situation in which the user U1 attempts to maintain his or her posture results in a similar situation in a case in which, in the real space, the user U1 is on a train and is traveling rightward while accelerating.

In addition, in a state of FIG. 11C, the display apparatus 100 presents a video captured by the unillustrated virtual camera with the rotation of its angle of view returned to the original angle of view in response to the leftward tilt of the head of the user U1.

In this way, in the video presentation system according to the present technology, even in the case where a user travels in the lateral direction while accelerating in the VR space, the user can naturally feel a force applied to the user by the acceleration, and thus, this configuration makes it possible to eliminate or minimize the VR sickness with an immersive feeling enhanced.

Note that the video presentation system according to the present technology can employ any other configuration capable of presenting a video that gives an immersive feeling to a user.

<5. Other Examples of Configurations of Video Presentation System>

Figure 12:
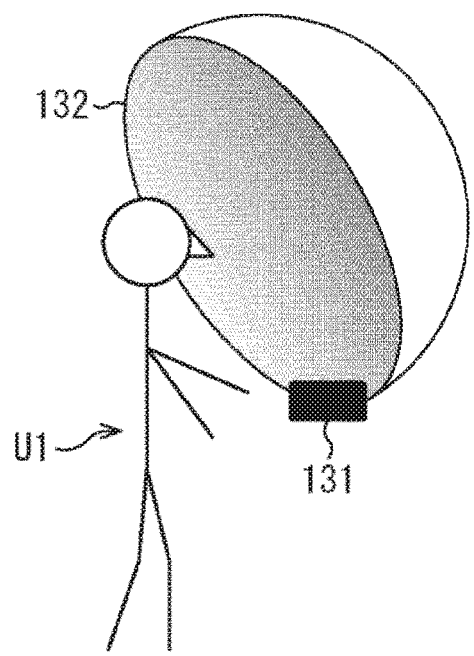
FIG. 12 is a diagram illustrating still another example of a configuration of the video presentation system.

FIG. 12 is a diagram illustrating an example of a configuration of a video presentation system in which a dome type display serves as a display apparatus.

FIG. 12 illustrates a condition in which the user U1 is watching videos in front of a display 132 on which a sensor 131 is mounted.

The sensor 131 includes an RGB camera, a depth sensor, and any other component and detects posture of the user U1 by means of skeleton recognition and the like for the user U1. The display 132 is configured as a dome type display and includes a dome-shaped display face. The display 132 presents a video serving as a field of view of the user U1 within the VR space.

Figure 13:
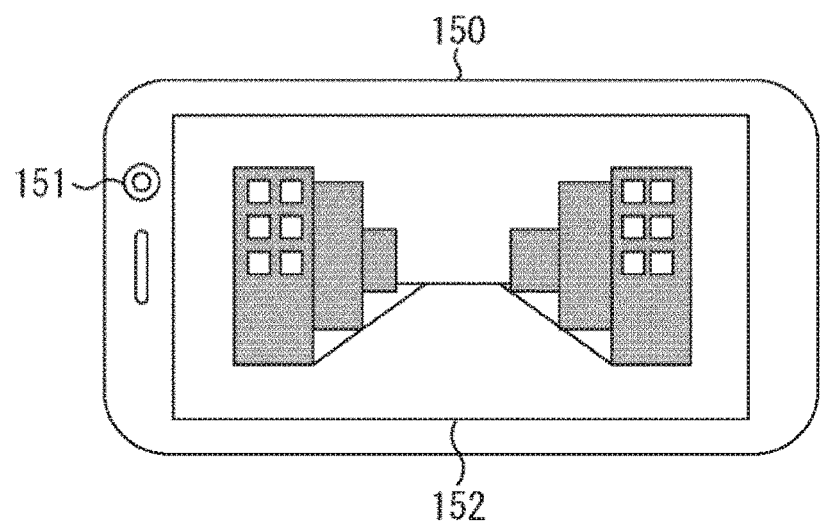
FIG. 13 is a diagram illustrating yet another example of a configuration of the video presentation system.

FIG. 13 is a diagram illustrating an example of a configuration of a video presentation system in which a mobile terminal serves as a display apparatus.

A mobile terminal 150 illustrated in FIG. 13 is configured as, for example, a smartphone, a tablet terminal, or the like and includes a sensor 151 and a display section 152.

The sensor 151 includes an RGB camera, a depth sensor, and any other component and detects posture of the user by means of skeleton recognition and the like for the user. The display section 152 is configured as a display having touch panel functions. The display section 152 presents a video serving as a field of view of the user within the VR space.

Even in the video presentation systems of FIG. 12 and FIG. 13, if these systems can present videos that give an immersive feeling, when a user travels while accelerating in the VR space, the user can naturally feel a force applied to the user by the acceleration, and thus, this configuration makes it possible to eliminate or minimize the VR sickness with an immersive feeling enhanced.

The above-described series of processes can be executed by hardware or software. In the case where the above-described series of processes is executed by software, programs constituting the software are installed from a network or a recording medium.

This recording medium includes, for example, the removable medium 31, illustrated in FIG. 3, which is distributed, separately from the apparatus body, to users of the information processing device 20 for the delivery of the programs. The removable medium 31 is implemented by a storage medium in which the programs are recorded, such as a magnetic disk (including a flexible disk), an optical disk (including a CD-ROM and a DVD), a magneto-optical disk, or a semiconductor memory. Further, the recording medium is implemented by not only such the above storage media but also a storage medium, such as the ROM 22, or a hard disk included in the storage unit 28, which records therein programs delivered to an administrator in a state of being preliminarily embedded in the apparatus body.

Note that, in the present description, the steps that describe the programs recorded in the recording medium include not only processes performed in a time-series way according to the above-described order, as a matter of course, but also processes that are not necessarily performed in the time-series way and may be performed in parallel or individually.

Further, embodiments of the present technology are not limited to the above-described embodiments, and various changes can be made thereon within the scope not departing from the gist of the present technology.

Further, the effects described in the present description are merely examples and are not limited ones, and there may be other effects.

Furthermore, the present technology can have the following configurations.

(1)
An information processing apparatus including:
a video generation section that, on the basis of head posture of a user, generates a video resulting from control of an angle of view of a virtual camera, the angle of view corresponding to a field of view of the user within a virtual space, in which
when the user is in an acceleration state in the virtual space, the video generation section changes the angle of view of the virtual camera from a first angle of view at a time when the user is in a non-acceleration state to a second angle of view based on an acceleration direction of the user.

(2)
The information processing apparatus according to (2), in which
the second angle of view includes an angel of view by which a visual righting reflex guides the head posture in a direction of a force that, in a real space, is applied to the user who is in a same state as the acceleration state.

(3)
The information processing apparatus according to (2), in which
when, in the virtual space, the user is in the acceleration state with acceleration applied forward, the video generation section inclines the angle of view of the virtual camera downward from a front forward direction.

(4)
The information processing apparatus according to (2), in which
when, in the virtual space, the user is in the acceleration state with acceleration applied backward, the video generation section inclines the angle of view of the virtual camera upward from a front forward direction.

(5)
The information processing apparatus according to (2), in which
when, in the virtual space, the user is in the acceleration state with turning involved, the video generation section rotates the angle of view of the virtual camera to an inner side of a direction of the turning.

(6)
The information processing apparatus according to (2), in which
when, in the virtual space, the user is in the acceleration state with acceleration applied leftward or rightward, the video generation section rotates the angle of view of the virtual camera to a direction of the acceleration.

(7)
The information processing apparatus according to any one of (1) to (6), in which
the acceleration state includes a state in which, in the virtual space, acceleration is forcibly applied to the user.

(8)
The information processing apparatus according to (7), in which
the acceleration state includes a state in which, in the virtual space, the user is travelling at a given acceleration by means of a travelling object independent of the user.

(9)
The information processing apparatus according to (8), in which
the travelling object includes a vehicle ridden by the user in the virtual space.

(10)
The information processing apparatus according to any one of (1) to (9), in which
the video generation section controls an amount of a change from the first angle of view to the second angle of view, according to a magnitude of acceleration of the user in the acceleration state.

(11)
The information processing apparatus according to (10), in which
the larger the acceleration of the user in the acceleration state is, the larger the video generation section makes the amount of the change from the first angle of view to the second angle of view.

(12)
The information processing apparatus according to (10) or (11), in which
in a case where the amount of the change from the first angle of view to the second angle of view exceeds a predetermined threshold value, the video generation section generates a second video different from a first video at a time when the user is in the acceleration state in the virtual space.

(13)
The information processing apparatus according to any one of (1) to (12), in which
the video generation section changes the angle of view of the virtual camera so as to bring the angle of view of the virtual camera close to the first angle of view from the second angle of view, according to a change of the head posture at a time when the user is in the acceleration state in the virtual space.

(14)
The information processing apparatus according to (13), in which
the video generation section calculates the angle of view of the virtual camera on the basis of a difference between a value corresponding to an amount of the change from the first angle of view to the second angle of view at the time when the user is in the acceleration state in the virtual space and a value corresponding to an amount of the change of the head posture at the time when the user is in the acceleration state in the virtual space.

(15)
The information processing apparatus according to any one of (1) to (14), further including:
a display control section that controls display of the video generated by the video generation section in a display apparatus.

(16)
The information processing apparatus according to (15), in which
the display apparatus includes an HMD.

(17)
The information processing apparatus according to (15), in which
the display apparatus includes a single display.

(18)
The information processing apparatus according to (15), in which
the display apparatus includes a mobile terminal.

(19)
An information processing method including:
generating, by an information processing apparatus, on the basis of head posture of a user, a video resulting from control of an angle of view of a virtual camera, the angle of view corresponding to a field of view of the user within a virtual space; and
when the user is in an acceleration state in the virtual space, changing, by the information processing apparatus, the angle of view of the virtual camera from a first angle of view at a time when the user is in a non-acceleration state to a second angle of view based on an acceleration direction of the user.

(20)

A program allowing a computer to perform processing, including:
generating, on the basis of head posture of a user, a video resulting from control of an angle of view of a virtual camera, the angle of view corresponding to a field of view of the user within a virtual space; and
changing, when the user is in an acceleration state in the virtual space, the angle of view of the virtual camera from a first angle of view at a time when the user is in a non-acceleration state to a second angle of view based on an acceleration direction of the user.

REFERENCE SIGNS LIST

10 HMD, 11 Display section, 20 Information processing apparatus, 51 Posture detection section, 52 Video generation section, 53 Display control section, 61 Angle of view control section, 81 Sensor, 82 Display, 150 Mobile terminal, 151 Sensor, 152 Display section

The invention claimed is:

1. An information processing apparatus, comprising:
a video generation section configured to generate a video based on an angle of view of a virtual camera associated with a user, wherein the angle of view corresponds to a field of view of the user within a virtual space, wherein
when the user is in a non-acceleration state in the virtual space, the video generation section is configured to generate the video based on a first angle of view of the virtual camera, and
when the user is in an accelerated state in the virtual space, the video generation section is configured to modify a viewing angle of the generated video based on a change in the angle of view of the virtual camera from the first angle of view to a second angle of view corresponding to an acceleration direction of the user.

2. The information processing apparatus according to claim 1, wherein the video is modified from the first angle of view to the second angle of view, to cause a visual righting reflex of the user that changes a head posture of the user in a real space, in a direction of a force that is applied to the user who is in a same state as the acceleration state.

3. The information processing apparatus according to claim 1, wherein
when, in the virtual space, the user is in the acceleration state with acceleration applied forward, the video generation section is configured to incline the angle of view of the virtual camera downward from a front forward direction.

4. The information processing apparatus according to claim 1, wherein
when, in the virtual space, the user is in the acceleration state with acceleration applied backward, the video generation section is configured to incline the angle of view of the virtual camera upward from a front forward direction.

5. The information processing apparatus according to claim 1, wherein
when, in the virtual space, the user is in the acceleration state with turning involved, the video generation section is configured to rotate the angle of view of the virtual camera to an inner side of a direction of the turning.

6. The information processing apparatus according to claim 1, wherein
when, in the virtual space, the user is in the acceleration state with acceleration applied leftward or rightward, the video generation section is configured to rotate the angle of view of the virtual camera to a direction of the acceleration.

7. The information processing apparatus according to claim 1, wherein
the acceleration state includes a state in which, in the virtual space, acceleration is forcibly applied to the user.

8. The information processing apparatus according to claim 7, wherein
the acceleration state includes a state in which, in the virtual space, the user is travelling at a specific acceleration by means of a travelling object independent of the user.

9. The information processing apparatus according to claim 8, wherein
the travelling object includes a vehicle ridden by the user in the virtual space.

10. The information processing apparatus according to claim 1, wherein
the video generation section is configured to control an amount of a change from the first angle of view to the second angle of view, according to a magnitude of acceleration of the user in the acceleration state.

11. The information processing apparatus according to claim 10, wherein
the larger the acceleration of the user in the acceleration state is, the larger the video generation section makes the amount of the change from the first angle of view to the second angle of view.

12. The information processing apparatus according to claim 10, wherein
in a case where the amount of the change from the first angle of view to the second angle of view exceeds a specific threshold value, the video generation section is configured to generate a second video different from a first video at a time when the user is in the acceleration state in the virtual space.

13. The information processing apparatus according to claim 1, wherein
the video generation section is configured to change the angle of view of the virtual camera so as to bring the angle of view of the virtual camera close to the first angle of view from the second angle of view, according to a change of a head posture at a time when the user is in the acceleration state in the virtual space.

14. The information processing apparatus according to claim 13, wherein
the video generation section is configured to calculate the angle of view of the virtual camera based on a difference between a value corresponding to an amount of the change from the first angle of view to the second angle of view at the time when the user is in the acceleration state in the virtual space and a value corresponding to an amount of the change of a head posture at the time when the user is in the acceleration state in the virtual space.

15. The information processing apparatus according to claim 1, further comprising:

a display control section that is configured to control display of the video generated by the video generation section, in a display apparatus.

16. The information processing apparatus according to claim 15, wherein the display apparatus includes an HMD.

17. The information processing apparatus according to claim 15, wherein the display apparatus includes a single display.

18. The information processing apparatus according to claim 15, wherein the display apparatus includes a mobile terminal.

19. An information processing method, comprising:
generating a video based on an angle of view of a virtual camera associated with a user, wherein
the angle of view corresponds to a field of view of the user within a virtual space,
when the user is in a non-accelerated state in the virtual space, the video is generated based a first angle of view of the virtual camera; and
modifying, when the user is in an accelerated state in the virtual space, a viewing angle of the generated video based on a change in the angle of view of the virtual camera from the first angle of view to a second angle of view corresponding to an acceleration direction of the user.

20. A non-transitory computer-readable medium storing computer-executable instructions, which when executed by a processor, cause the processor to execute operations, the operations comprising:
generating a video based on an angle of view of a virtual camera associated with a user, wherein
the angle of view corresponds to a field of view of the user within a virtual space,
when the user is in a non-accelerated state in the virtual space, the video is generated based a first angle of view of the virtual camera; and
modifying, when the user is in an accelerated state in the virtual space, a viewing angle of the generated video based on a change in the angle of view of the virtual camera from the first angle of view to a second angle of view that corresponding to an acceleration direction of the user.

* * * * *